US008163819B2

(12) United States Patent
Graham et al.

(10) Patent No.: US 8,163,819 B2
(45) **Date of Patent: *Apr. 24, 2012**

(54) ADHESIVE COMPOSITIONS, MICRO-FLUID EJECTION DEVICES AND METHODS FOR ATTACHING MICRO-FLUID EJECTION HEADS

(75) Inventors: David Christopher Graham, Lexington, KY (US); Gary Anthony Holt, Jr., Lexington, KY (US); Jonathan Harold Laurer, Boone, NC (US); Johnny Dale Massie, II, Lexington, KY (US); Melissa Marie Waldeck, Lexington, KY (US); Sean Terrence Weaver, Union, KY (US); Rich Wells, Westerville, OH (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,857

(22) Filed: Apr. 27, 2010

(65) Prior Publication Data

US 2010/0210759 A1 Aug. 19, 2010

Related U.S. Application Data

(63) Continuation of application No. 11/382,876, filed on May 11, 2006, now abandoned.

(60) Provisional application No. 60/743,920, filed on Mar. 29, 2006.

(51) Int. Cl.
*C08L 63/00* (2006.01)
*C09J 163/00* (2006.01)

(52) U.S. Cl. ........................................ 523/461; 523/466

(58) Field of Classification Search .................. 523/457, 523/458, 461, 466; 525/523, 524
See application file for complete search history.

(56) References Cited

U.S. PATENT DOCUMENTS

| | | | | |
|---|---|---|---|---|
| 5,717,054 | A * | 2/1998 | Schultz | 528/100 |
| 6,358,354 | B1 * | 3/2002 | Patil | 156/273.3 |
| 6,749,288 | B2 * | 6/2004 | Ahne et al. | 347/56 |
| 7,766,455 | B2 * | 8/2010 | Graham et al. | 347/47 |
| 7,819,506 | B2 * | 10/2010 | Graham et al. | 347/64 |
| 2003/0036587 | A1 * | 2/2003 | Kozak | 523/445 |
| 2007/0229575 | A1 * | 10/2007 | Graham et al. | 347/20 |
| 2007/0229594 | A1 * | 10/2007 | Graham et al. | 347/47 |
| 2007/0236542 | A1 * | 10/2007 | Graham et al. | 347/70 |
| 2011/0014354 | A1 * | 1/2011 | Graham et al. | 427/8 |

FOREIGN PATENT DOCUMENTS

WO WO 98/55316 A1 * 12/1998

* cited by examiner

*Primary Examiner* — Michael J Feely

(57) ABSTRACT

Adhesive compositions, micro-fluid ejection devices, and methods for attaching micro-fluid ejection heads to devices. One such adhesive composition is provided for use in attaching a micro-fluid ejection head to a device, such as to reduce chip bowing and/or to decrease chip fragility upon curing of the adhesive. Such an exemplary composition may include one having from about 50.0 to about 95.0 percent by weight of at least one cross-linkable resin selected from the group consisting of epoxy resins, siloxane resins, urethane resins, and functionalized olefin resins; from about 0.1 to about 25.0 percent by weight of at least one thermal curative agent; and from about 0.0 to about 30.0 percent by weight filler, and exhibit a relatively low shear modulus upon curing (e.g., less than about 10.0 MPa at 25° C.).

2 Claims, 3 Drawing Sheets

ADHESIVE COMPOSITIONS, MICRO-FLUID EJECTION DEVICES AND METHODS FOR ATTACHING MICRO-FLUID EJECTION HEADS

RELATED APPLICATIONS

This application is a continuation application of parent application Ser. No. 11/382,876, filed May 11, 2006 (now abandoned), entitled "Adhesive Compositions, Micro-Fluid Ejection Devices, and Methods for Attaching Micro-Fluid Ejection Heads" which claims priority to provisional application Ser. No. 60/743,920, filed Mar. 29, 2006.

TECHNICAL FIELD

The disclosure relates to adhesive compositions, and in one particular embodiment, to flexible compounds that can be cured for use as adhesives in micro-fluid ejection devices.

BACKGROUND AND SUMMARY

Micro-fluid ejection heads are useful for ejecting a variety of fluids including inks, cooling fluids, pharmaceuticals, lubricants and the like. A widely used micro-fluid ejection head is an inkjet print head used in an ink jet printer. Ink jet printers continue to be improved as the technology for making their micro-fluid ejection heads continues to advance.

In the production of conventional thermal ink jet print cartridges for use in ink jet printers, one or more micro-fluid ejection heads are typically bonded to one or more chip pockets of an ejection device structure. A micro-fluid ejection head typically includes a fluid-receiving opening and fluid supply channels through which fluid travels to a plurality of bubble chambers. Each bubble chamber includes an actuator such as a resistor which, when addressed with an energy pulse, momentarily vaporizes the fluid and forms a bubble which expels a fluid droplet. The micro-fluid ejection head typically comprises an ejector chip and a nozzle plate having a plurality of discharge orifices formed therein.

A container, which may be integral with, detachable from or remotely connected to (such as by tubing) the ejection device structure, serves as a reservoir for the fluid and includes a fluid supply opening that communicates with a fluid-receiving opening of a micro-fluid ejection head for supplying ink to the bubble chambers in the micro-fluid ejection head.

During assembly of the micro-fluid ejection head to the ejection device structure, an adhesive is used to bond the ejection head to the ejection device structure. The adhesive "fixes" the micro-fluid ejection head to the ejection device structure such that its location relative to the ejection device structure is substantially immovable and does not shift during processing or use of the ejection head. The bonding and fixing step is often referred to as a "die attach step." Further, the adhesive may provide additional functions such as serving as a fluid gasket against leakage of fluid and as corrosion protection for conductive tracing. The latter function for the adhesive is referred to as part of the adhesive's encapsulating function, thereby further defining the adhesive as an "encapsulant" to protect electrical components of or used with the micro-fluid ejection head, such as a flexible circuit (e.g., a TAB circuit) attached to the micro-fluid ejection head.

However, the micro-fluid ejection head and the ejection device structure typically have dissimilar coefficients of thermal expansion. For example, micro-fluid ejection heads may have silicon or ceramic substrates that are bonded to an ejection device structure that may be a polymeric material such as a modified phenylene oxide. Thus, the adhesive must often accommodate both dissimilar expansions and contractions of the micro-fluid ejection head and the ejection device structure, and be resistant to attack by the ejected fluid.

Conventional adhesive materials tend to be non-flexible and brittle after curing due to high temperatures required for curing and relatively high shear modulus of the adhesive materials upon curing. Such properties may cause the adhesive materials to chip or crack. It may also cause the components (e.g., micro-fluid ejection head and/or ejection device structure) to bow, chip, crack, or otherwise separate from one another, or to be less resilient to external forces (e.g., chips may be more prone to crack when dropped). For example, during a conventional thermal curing process, the ejection device structure typically expands before a conventional die bond adhesive material is fully cured. The diebond material thus moves with the expanding device structure, wherein the diebond material cures with the device structure in an expanded state. Upon cooling the device structure, the device structure contracts and, with a rigid, cured diebond material, induces high stress onto the ejection head to cause the aforementioned bowing, chipping, cracking, separating, etc. Among other problems, such events can result in fluid leakage and poor adhesion as well as malfunctioning of the micro-fluid ejection heads, such as misdirected nozzles. Moreover, attempts to make adhesive materials more flexible after curing often lead to adhesive materials that are less resistant to chemical degradation by the fluids being ejected.

Accordingly, a need exists for, amongst other things, a flexible adhesive composition that is curable at relatively low temperatures and that is suitable for use in assembling micro-fluid ejection head components, and particularly, for attaching micro-fluid ejection heads to ejection device structures.

With regard to the foregoing and other object and advantages, various embodiments of the disclosure provide a thermally curable adhesive composition for attaching a micro-fluid ejection head to a device wherein the adhesive has a relatively low shear modulus upon curing. Various exemplary embodiments also provide a micro-fluid ejection head having an ejector chip and a thermally curable adhesive attached thereto, the adhesive having a shear modulus of less than about 10 MPa at 25° C., wherein "MPa" stands for "MegaPascals" (i.e., $1.0\times10^6$ Pascals).

Additionally, embodiments provide a micro-fluid ejection device having an ejector chip and a thermally curable adhesive attached thereto, the adhesive having a glass transition temperature of less than about 65° C. Various other embodiments provide a method for attaching a micro-fluid ejection head to a device. One such method includes attaching the head to a device with a thermally curable adhesive with a relatively low shear modulus dispensed between the head and the device, and curing the adhesive composition to provide the micro-fluid ejection device.

Advantages of the exemplary embodiments may include, but are not limited to, a reduction in ejector chip substrate bow, an increase in ejector head durability, increased planarity of the ejector head, and the like. Other advantages might include the provision of adhesives having improved mechanical, adhesive, and ink resistive properties. Reduced stresses may be present in the ejector head substrates due to the presence of improved adhesives according to the disclosed embodiments.

BRIEF DESCRIPTION OF THE DRAWINGS

Further features and advantages of the disclosed embodiments may become apparent by reference to the detailed description when considered in conjunction with the figures, which are not to scale, wherein like reference numbers indicate like elements through the several views, and wherein.

DETAILED DESCRIPTION OF EXEMPLARY EMBODIMENTS

In general, the disclosure is directed to describing improved compositions, structures, and methods related to thermally curable adhesives used to assemble component parts of micro-fluid ejection devices. More specifically, the improved adhesive compositions discussed herein might be used to, for example, reduce residual stresses that may result from heat-treating micro-fluid ejection heads to cure the adhesives.

Figure 1:
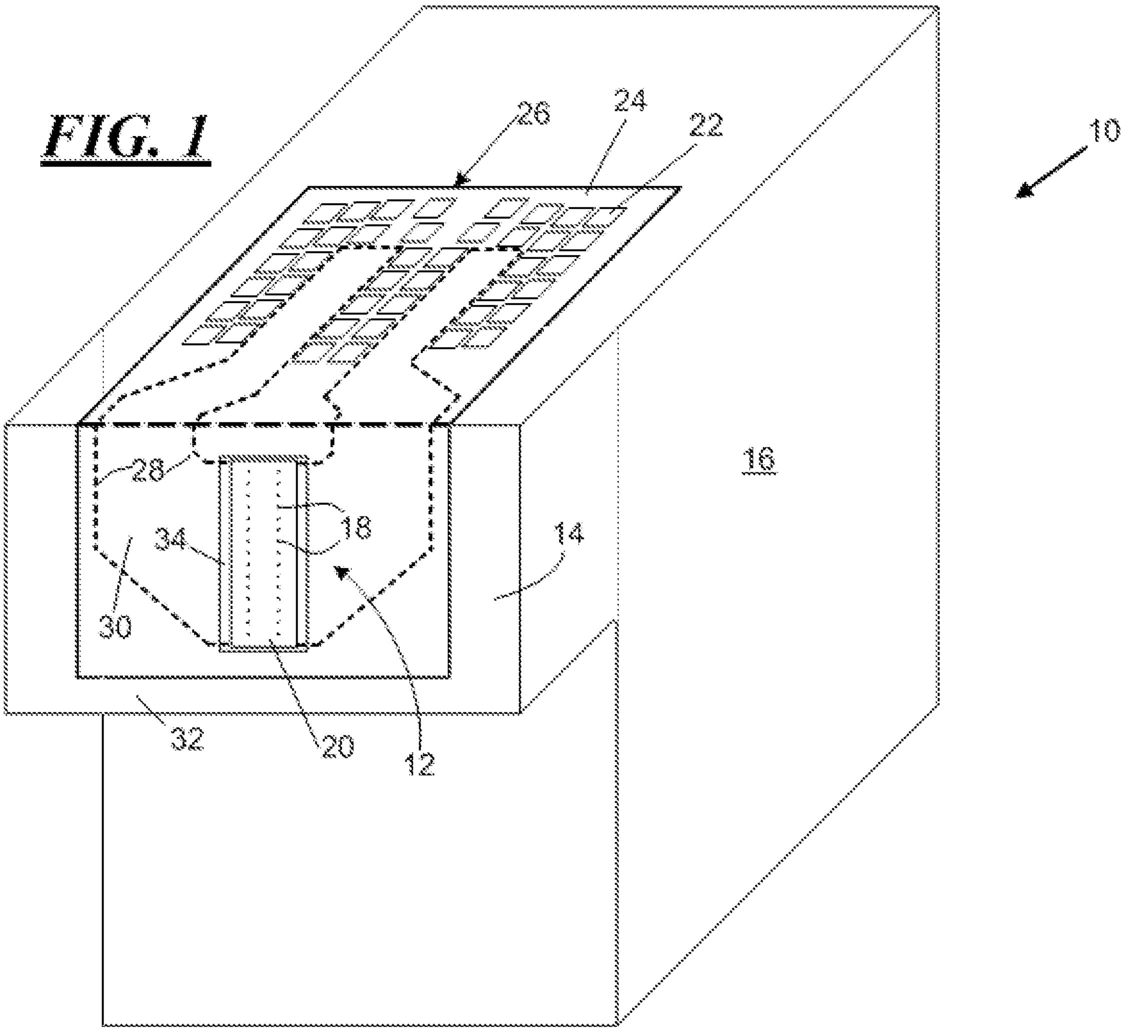
FIG. 1 is a perspective view of a micro-fluid ejection device according to an exemplary embodiment of the disclosure.

In order to more fully disclose various embodiments of the invention, attention is directed to the following description of a representative micro-fluid ejection device incorporating the improved thermally curable adhesive described herein. With reference to FIG. 1, there is shown, in perspective view, a micro-fluid ejection device 10 including one or more micro-fluid ejection heads 12 attached to a head portion 14 of the device 10. A fluid reservoir 16 containing one or more fluids is fixedly (or removably) attached to the head portion 14 for feeding fluid to the one or more micro-fluid ejection heads 12 for ejection of fluid toward a media or substrate from nozzles 18 on a nozzle plate 20. Although FIG. 1 illustrates the fluid reservoir being directly attached to a head portion 14, other embodiments might attach a fluid reservoir indirectly to a head portion, such as by tubing, for example. Each reservoir 16 may contain a single fluid, such as a black, cyan, magenta or yellow ink or may contain multiple fluids. In the illustration shown in FIG. 1, the device 10 has a single micro-fluid ejection head 12 for ejecting a single fluid. However, the device 10 may contain two or more ejection heads for ejecting two or more fluids, or a single ejection head 12 may eject multiple fluids, or other variations on the same.

Figure 2:
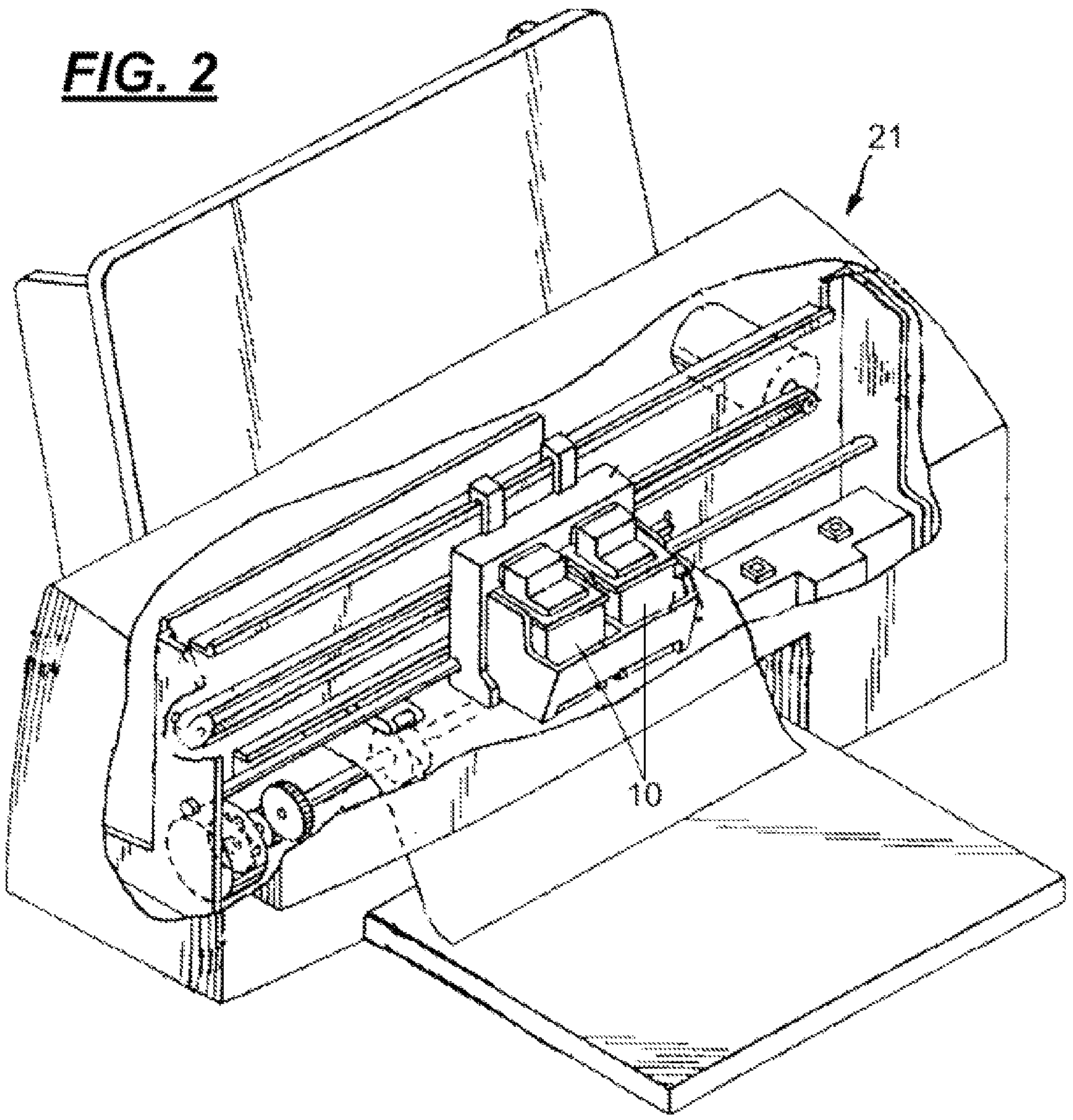
FIG. 2, is a perspective view, not to scale, of an ink jet printer capable of controlling a micro-fluid ejection device according to the disclosure.

In order to control the ejection of fluid from the nozzles 18, each of the micro-fluid ejection heads 12 is usually electrically connected to a controller in an ejection control device, such as, for example, a printer 21 (FIG. 2), to which the device 10 is attached. In the illustrated embodiment, connections between the controller and the device 10 are provided by contact pads 22 which are disposed on a first portion 24 of a flexible circuit 26. An exemplary flexible circuit 26 is formed from a resilient polymeric film, such as a polyimide film, which has conductive traces 28 thereon for conducting electrical signals from a source to the ejection head 12 connected to the traces 28 of the flexible circuit 26. A second portion 30 of the flexible circuit 26 is typically disposed on an operative side 32 of the head portion 14. The reverse side of the flexible circuit 26 typically contains the traces 28 which provide electrical continuity between the contact pads 22 and the micro-fluid ejection heads 12 for controlling the ejection of fluid from the micro-fluid ejection heads 12. TAB bond or wire bond connections, for example, are made between the traces 28 and each individual micro-fluid ejection head 12 as described in more detail below.

Figure 3:
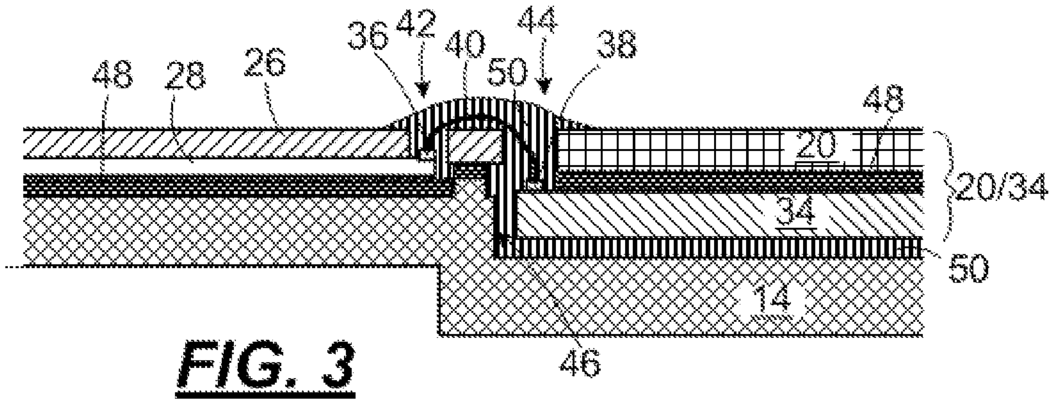
FIG. 3 is a cross-sectional view, not to scale, of a portion of a micro-fluid ejection device according to an embodiment of the disclosure.

Exemplary connections between a flexible circuit and a micro-fluid ejection head are shown in detail by reference to FIG. 3. As described above, flexible circuits 26 contain traces 28 which are electrically connected to a substrate 34. The substrate 34 may be part of an ejector chip having resistors and/or other actuators, such as piezoelectric devices or MEMs devices for inducing ejection of fluid through nozzles 18 of a nozzle plate 20 toward a print media. Connection pads 36 on the flexible circuits 26 are operatively connected to bond pads 38 on the substrate 34, such as by TAB bonding techniques or by use of wires 40 using a wire bonding procedure through windows 42 and/or 44 in the circuit 26 and/or nozzle plate 20.

As shown in FIG. 3, the substrate 34 is attached to the head portion 14, such as in a chip pocket 46. Prior to attaching the substrate 34 to the head portion 14, a nozzle plate 20 may be adhesively attached to the ejector chip using adhesive 48 (in another embodiment, a nozzle plate may be attached to the ejector chip by forming the nozzle plate on the substrate using photoimageable techniques). The assembly provided by the nozzle plate 20 attached to the substrate 34 is referred to herein as the substrate/nozzle plate assembly 20/34 (FIG. 3). In some embodiments, the assembly 20/34 encompasses the micro-fluid ejection head itself.

The adhesive 48 may be a heat curable adhesive such a B-stageable thermal cure resin, including, but not limited to phenolic resins, resorcinol resins, epoxy resins, ethylene-urea resins, furane resins, polyurethane resins and silicone resins. The adhesive 48 may be cured before attaching the substrate 34 to the head portion 14 and, in an exemplary embodiment, the adhesive 48 has a thickness ranging from about 1 to about 25 microns.

After bonding the nozzle plate 20 and substrate 34 together, the substrate/nozzle plate assembly 20/34 may be attached to the head portion 14 in chip pocket 46 using a die bond adhesive 50. In various embodiments of the disclosure, the die bond adhesive 50 used to connect the substrate/nozzle plate assembly 20/34 to the head portion 14 includes one or more adhesive components that make up a composition having a relatively low shear modulus.

"Shear modulus" involves the relation of stress to strain according to Hooke's Law as shown in Equation (1) as follows:

$$(\text{stress})=\mu(\text{strain}) \qquad (1)$$

In Equation (1), "μ" represents a quantity often referred to as rigidity. When the relationship illustrated by Equation (1) is applied to a force "F" across a given area "A," Equation (1) may be more specifically represented by Equation (2) as follows:

$$F/A=\mu(\Delta L/L) \qquad (2)$$

In Equation (2) above, the variable "L" represents original length of an object before said object was acted upon by force F. "ΔL" represents the change in length occurring after force "F" has acted upon the object. Therefore, the rigidity ("μ") of the object is a proportionality constant relating the pressure applied to an object with the ratio between the object change in length with the objects original length.

When Equation (2) and a given rigidity value "μ" are used to determine elastic properties of an object, Equation (3), shown below, is used to derive a shear modulus value from the rigidity "μ" value determined in Equation (2). Equation (3) is shown below as follows:

$$\mu=E/2(L+v) \quad (3)$$

In Equation (3) above, shear modulus is the proportional relationship between rigidity "μ" and the right hand side of the equation, including the Poisson ratio "v" and Young's modulus "E."

Applying Hooke's Law and elasticity theory to physical properties of micro-fluid ejection heads, reliable data may be established to correlate the elastic properties of adhesives with the effect of said adhesives on one or more surfaces of a micro-fluid ejection head. Shear modulus values are dependent on temperature, therefore, a given shear modulus value for a given adhesive will be given in pressure units at a specific temperature. Various embodiments of the disclosure include compositions with shear modulus values of less than 10 MPa at 25° C. as determine by a rheometer from TA Instruments of New Castle, Del. under the trade name ARES in a dynamic parallel plate configuration with a frequency of 1.0 rad/sec and a strain of 0.3% after the material is cured. In certain exemplary embodiments, one or more of the claimed compositions have shear modulus values of less than about 1.0 MPa at 25° C.

Figure 4A:
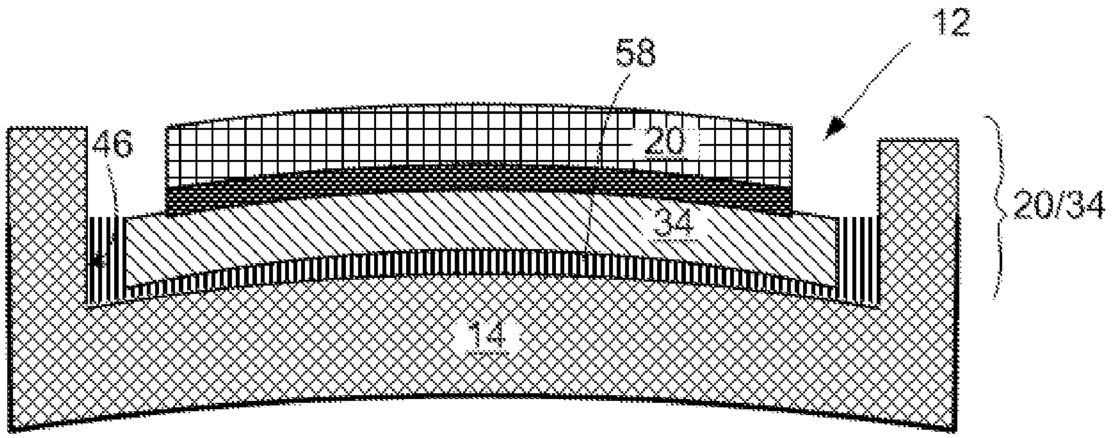
FIG. 4A PRIOR ART
FIG. 4A is a cross-sectional view, not to scale, of a micro-fluid ejection device incorporating one or more prior art adhesive compositions.

With reference now to FIG. 4A, a cross-sectional view of a non-planar micro-fluid ejection head 12 (e.g., substrate/nozzle plate assembly 20/34) is illustrated. The substrate/nozzle plate assembly 20/34 is attached to a head portion 14 in a chip pocket 46. In the prior art ejection head 12, the substrate/nozzle plate assembly 20/34 was attached to the chip pocket 46 using a prior art die attach adhesive 58 having a shear modulus of substantially more than 10 MPa at 25° C. The non-planar characteristic of micro-fluid ejection head 12 is caused at least in part by high temperature curing of the die attach adhesive 58.

The example shown in FIG. 4A is provided to illustrate certain undesirable effects of high temperature curing including non-planar micro-fluid ejection head surfaces causing undesirable effects such as "chip bowing," adhesive layer cracking, and increased overall fragility of the micro-fluid ejection head 12 and substrate/nozzle plate assembly 20/34. Chip bowing typically results from the substrate/nozzle plate assembly 20/34 and the head portion 14 having dissimilar coefficients of thermal expansion, since the surface of the substrate/nozzle plate assembly 20/34 bonded to the head portion 14 most commonly is silicon or ceramic and the portion 14 is, for example, typically a polymeric material such as a modified phenylene oxide. Thus, the adhesive 58 should be flexible enough to accommodate both the dissimilar expansions and contractions of the substrate chip/nozzle plate assembly 20/34 and the head portion 14. Chip bowing may result in nozzles being misaligned or aligned at an undesired angle (often called "planarity" of nozzles), which may also diminish the quality of fluid ejected from the nozzles.

Chip fragility is believed to increase in severity because the adhesive layer reaches its glass transition temperature ($T_g$) before the substrate/nozzle plate assembly 20/34 and head portion 14 have finished cooling and contracting relative to one another after the curing of the adhesive layer 58, imparting stress onto the substrate/nozzle plate assembly. Accordingly, in an exemplary embodiment of the invention, an adhesive is used that has glass transition temperature below the temperature to which the head portion 14 is cooled. For example, an adhesive with a glass transition temperature of less than about 65° C., such as one having a glass transition temperature of less than about 50° C. or less than about 25° C. might be used in an exemplary embodiment.

The glass transition temperature of a material with elastic properties is the temperature at which the material transitions to more brittle physical properties or more elastic physical properties, depending on whether the temperature is decreasing or increasing, respectively. After curing, as the adhesive layer 58 cools below its glass transition temperature, the adhesive 58 becomes significantly more brittle than before reaching its glass transition temperature. If the adhesive 58 is stretched or compressed at a temperature below its glass transition temperature, the adhesive may crack or buckle. Therefore, using adhesives with lower glass transition temperatures will decrease the chances of adhesive cracking or buckling. Similarly, considering that shear modulus values directly relate to how brittle an adhesive will be at a given temperature, adhesives having lower shear modulus values are more flexible at lower temperatures, thereby decreasing the likelihood of adhesive cracking or buckling. Adhesive layer cracking may result in a compromised fluid seal, whereby micro-fluid ejection fluid leaks from the substrate/nozzle plate assembly 20/34 might cause undesirable deposits of fluid, and/or corrosion of electrical components.

High curing temperatures may also cause increased fragility. Adhesives having lower shear modulus values and lower glass transition temperatures may be cured with lower temperatures thereby, decreasing the chances for micro-fluid ejection head fragility. Increased fragility of micro-fluid ejection heads increases the chances for micro-fluid ejection products becoming unfit for use due to shattering of micro-fluid ejections heads and other parts of the micro-fluid ejection device.

Figure 4B:
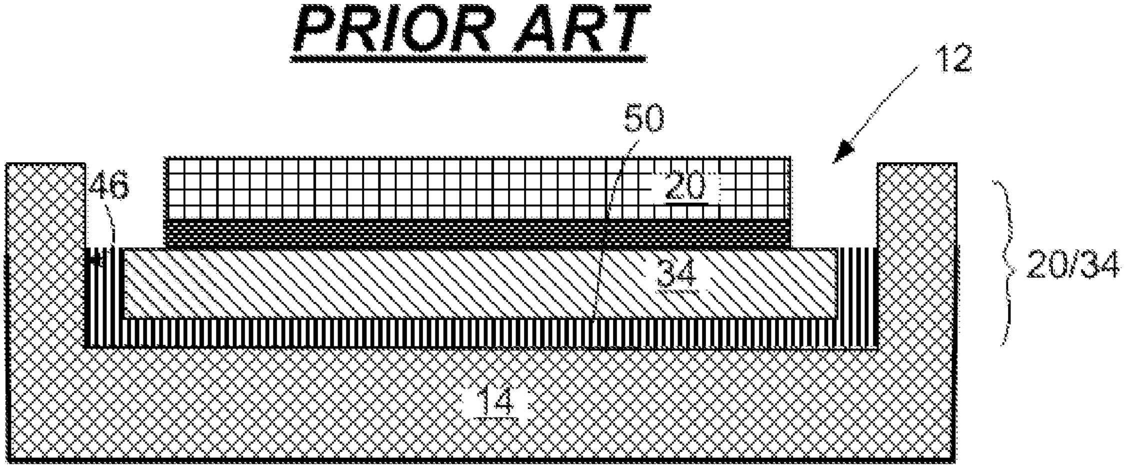
FIG. 4B is a cross-sectional cutaway side view, not to scale, of a portion of a micro-fluid ejection device according to an embodiment of the disclosure.

In contrast to FIG. 4A, the head portion 14 shown in FIG. 4B illustrates a micro-fluid ejection head 12 comprising a substrate/nozzle plate assembly 20/34 that is attached to the chip pocket 46 using die attach adhesive 50 made of one or more of the compositions described herein. Using compositions such as that described below may result in decreased chip bowing, decreased micro-fluid ejection head cracking, and/or decreased fragility of micro-fluid ejection heads. Such improved characteristics may be possible by the use of a die attach adhesive having a relatively low shear modulus. For the purposes of certain embodiments in this disclosure, "relatively low shear modulus" is defined as a shear modulus at least lower than about 10 MPa at 25° C. "Relatively low shear modulus" may, however, be defined as a shear modulus lower than about 1.0 MPa at 25° C. for certain exemplary embodiments disclosed herein.

In an exemplary embodiment, die attach adhesive 50 is a composition including (1) from about 50.0 to about 95.0 percent by weight of at least one cross-linkable resin selected from the group of epoxy resins, siloxane resins, urethane resins, and functionalized olefin resins; (2) from about 0.1 to about 25.0 percent by weight of at least one thermal curative agent selected from the group of imidazoles, amines, peroxides, organic accelerators, and sulfur; and (3) from about 0.0 to about 30.0 percent by weight filler, wherein the composition exhibits a relatively low shear modulus upon curing. In some variations of these exemplary embodiments, the adhesive 50 may include from about 0.0 to about 10.0 percent by weight silane coupling agent. In the embodiments described above, the filler may include from about 0.0 to about 30.0 percent by weight titanium dioxide, and from about 0.0 to about 30.0 percent by weight fumed silica or another filler component such as clay or functionalized clay, silica, talc, carbon black, carbon fibers.

More specific exemplary embodiments of the composition of adhesive 50 are listed in Tables 1 through Table 7 below.

TABLE 1

(Composition 1)

| Material | Concentration (percent by weight) | Trade name | Supplier |
|---|---|---|---|
| Flexible epoxy resin | 37.8 | GE-35 | CVC |
| Aliphatic flexible epoxy resin | 37.8 | Epalloy 3-23 | CVC |
| Bisphenol M | 8.4 | Bisphenol M | Aldrich |
| Imidazole catalyst | 9.5 | Curezol-17-Z | Air Products |
| Epoxy silane | 0.2 | A-187 | GE Silicones |
| Titanium dioxide | 4.2 | Ti-Pure R-900 | DuPont |
| Fumed Silica | 2.1 | TS-720 | Cabot |

As shown above, composition 1 includes from about 25.0 to about 50.0 percent by weight multi-functional epoxy resin; from about 25.0 to about 50.0 percent by weight aliphatic di-functional epoxy resin; and from about 0.1 to about 15.0 percent by weight phenolic cross-linking agent. The composition also includes from about 0.1 to about 20.0 percent by weight of an imidazole catalyst and from about 0.0 to about 30.0 weight percent fillers. As shown in Table 8, Composition 1 has a relatively low shear modulus value of about 0.225 MPa at 25° C. and a low glass transition temperature of about 10.5° C.

There are a number of epoxy resins, curing agents, and fillers available for application with various embodiments of the invention. In the first composition illustrated in Table 1, an exemplary multi-functional epoxy resin is available from CVC Specialty Chemicals, Inc. under the trade name ERISYS GE-35. An exemplary aliphatic di-functional epoxy resin is available from CVC Specialty Chemicals, Inc. under the trade name EPALLOY 3-23. A suitable phenolic cross-linking agent is available from Sigma Aldrich Company under the trade designation Bisphenol M. A useful curing agent is available from Air Products and Chemicals, Inc. under the trade name CUREZOL C17Z. A suitable epoxy silane coupling agent is available from GE Advanced Materials, Silicones of Wilton, Conn. under the trade name SILQUEST A-187 SILANE. Suitable fillers such as titanium dioxide, and fumed silica are available from a number of different suppliers. For example, titanium dioxide is available from DuPont Titanium Technologies under the trade name TI-PURE R-900 and fumed silica is available from Cabot Corporation of Boston, Mass. under the trade name CAB-O-SILTS-720.

TABLE 2

(Composition 2)

| Material | Concentration (percent by weight) | Trade name | Supplier |
|---|---|---|---|
| Diphenyl siloxane | 79.5 | PMS-E15 | Gelest |
| Tetraethylene-pentamine | 7.7 | TEPA | Air Products |
| Epoxy Silane | 0.9 | A-187 | GE Silicones |
| Titanium dioxide | 4.0 | Ti-Pure R-900 | Dupont |
| Fumed Silica | 7.9 | TS-720 | Cabot |

In Table 2, composition 2, includes from about 50.0 to about 95.0 percent by weight diphenyl siloxane resin, from about 0.1 to about 20.0 percent by weight of tetraethylenepentamine, and from about 0.0 to about 10.0 percent by weight epoxy silane. The fillers include from about 0.0 to about 30.0 percent by weight titanium dioxide; and from about 0.0 to about 30.0 percent by weight fumed silica. As shown in Table 8, Composition 2 has a relatively low shear modulus value of about 1.98 MPa at 25° C. and a low glass transition temperature of about −11.2° C.

In accordance with the foregoing composition, a suitable diphenyl siloxane resin is available from Gelest, Inc. of Morrisville, Pa. under the trade name PMS E-15. A useful tetraethylenepentamine curing agent for this composition is available from Air Products or Sigma Aldrich Company under the trade designation TEPA (Tetraethylenepentamine).

TABLE 3

(Composition 3)

| Material | Concentration (percent by weight) | Trade name | Supplier |
|---|---|---|---|
| Flexible epoxy resin | 19.9 | GE-35 | CVC |
| Epoxy siloxane | 19.9 | SIB1115.0 | Gelest |
| Carboxyl-terminated butadiene | 39.7 | 2000X162 | Noveon |
| Amine adduct | 10.7 | Ancamine 2337 | Air Products |
| Epoxy Silane | 0.2 | A-187 | GE Silicones |
| Titanium dioxide | 4.0 | Ti-Pure R-900 | Dupont |
| Fumed Silica | 5.6 | TS-720 | Cabot |

Table 3 illustrates yet another exemplary adhesive composition. Composition 3 includes from about 0.0 to about 50.0 percent by weight multi-functional epoxy resin; from about 0.0 to about 50.0 percent by weight epoxy siloxane resin; from about 0.0 to about 90.0 percent by weight carboxyl-terminated butadiene; and from about 0.1 to about 20.0 percent by weight of an amine adduct thermal curative agent. This embodiment also includes from about 0.0 to about 15.0 percent by weight epoxy silane, from about 0.0 to about 30.0 percent by weight titanium dioxide, and from about 0.0 to about 30.0 percent by weight fumed silica. As shown in Table 8, Composition 3 has a substantially low shear modulus value of about 0.175 MPa at 25° C. and a low glass transition temperature of about −6.7° C.

In accordance with the foregoing composition, the epoxy siloxane that may be used is available from Gelest, Inc. is under the trade designation SIB1115.0. The carboxyl-terminated butadiene that may be used is available from Noveon Specialty Chemicals of Cleveland, Ohio under the trade name HYCAR CTB 2000×162. A suitable curing agent in the form of an amine adduct is available from Air Products and Chemicals, Inc. under the trade name ANCAMINE 2337S.

TABLE 4

(Composition 4)

| Material | Concentration (percent by weight) | Trade name | Supplier |
|---|---|---|---|
| Epoxidized butadiene resin | 36.2 | Poly BD 600E | Sartomer |
| Anhydride functional butadiene | 50.7 | 130-MA-8 | Sartomer |
| Anhydride cross linker | 6.1 | MHHPA | Miller-Stephenson |
| Azine imidazole | 2.3 | 2MZ-Azine | Air Products |

TABLE 4-continued

| (Composition 4) | | | |
|---|---|---|---|
| Material | Concentration (percent by weight) | Trade name | Supplier |
| Epoxy Silane | 0.4 | A-187 | GE Silicones |
| Titanium dioxide | 2.0 | Ti-Pure R-900 | DuPont |
| Fumed Silica | 2.3 | TS-720 | Cabot |

As provided in Table 4, Composition 4 includes from about 0.0 to about 50.0 percent by weight epoxidized butadiene resin; from about 0.0 to about 75.0 percent by weight anhydride functional butadiene; from about 0.1 to about 20.0 percent by weight anhydride cross-linking agent; and from about 0.1 to about 20.0 percent by weight of an azine imidazole thermal curative agent. From about 0.0 to about 15.0 percent by weight epoxy silane; from about 0.0 to about 30.0 percent by weight titanium dioxide; and from about 0.0 to about 30.0 percent by weight fumed silica are also included in the composition. As shown in Table 8, Composition 4 has a considerably lower shear modulus value of about 0.151 MPa at 25° C. and a considerably lower glass transition temperature of about −30° C.

For composition 4, a suitable epoxidized butadiene resin is available from Sartomer Company, Inc. of Exton, Pa. under the trade name POLY BD 600E. A suitable anhydride functional butadiene resin that may be used is available from Sartomer Company, Inc. of Exton, Pa. under the trade name RICON 130MA8. The cross-linking agent that may be used is available from Miller-Stephenson Chemical Company, Inc. under the trade designation Anhydride MHHPA. A suitable curing agent is an azine imidazole that is available from Air Products and Chemicals, Inc. under the trade name CUREZOL® 2MZ Azine.

TABLE 5

| (Composition 5) | | | |
|---|---|---|---|
| Material | Concentration (percent by weight) | Trade name | Supplier |
| Methacrylated butadiene resin | 86.0 | Riacryl 3100 | Sartomer |
| Peroxide catalyst | 2.8 | Luperox LP | Aldrich |
| Epoxy Silane | 0.9 | A-187 | GE Silicones |
| Titanium dioxide | 4.3 | Ti-Pure R-900 | Dupont |
| Fumed Silica | 6.0 | TS-720 | Cabot |

As provided in Table 5, Composition 5 includes from about 50.0 to about 95.0 percent by weight methacrylated butadiene resin, and from about 0.1 to about 30.0 percent by weight of peroxide catalyst thermal curative agent. A suitable methacrylated butadiene resin is available from Sartomer Company, Inc. of Exton, Pa. under the trade name RICACRYL 3100. The curing agent is suitably a peroxide catalyst available from Sigma Aldrich Company under the trade name LUPEROX LP. As shown in Table 8, Composition 5 has a low shear modulus value of about 0.74 MPa at 25° C. and a considerably lower glass transition temperature of less than −60° C.

TABLE 6

| (Composition 6) | | | |
|---|---|---|---|
| Material | Concentration (percent by weight) | Trade name | Supplier |
| Flexible epoxy resin | 73.6-88.0 | EXA-4850 | Dainippon Ink |
| Bisphenol M | 0-8.4 | Bisphenol M | Aldrich |
| Imidazole catalyst | 9.2-11.0 | CUREZOL-17-Z | Air Products |
| Epoxy Silane | 0.8-1.0 | A-187 | GE Silicones |
| Amine adduct | 0-4.1 | ANCAMINE 2337 | Air Products |
| Fumed Silica | 0-4.1 | TS-720 | Cabot |

As provided in Table 6, Composition 6 includes from about 50.0 to about 95.0 percent by weight flexible epoxy resin, from about 0.0 to about 30 percent by weight bisphenol-M, and from about 0.1 to about 20.0 percent by weight of imidazole catalyst thermal curative agent. A suitable flexible epoxy resin is available from Dainippon Ink and Chemicals, Inc. of Tokyo, Japan under the trade name EPICLON EXA-4850. As shown in Table 8, Composition 6 has a low shear modulus value ranging from about 1.75 to about 4.4 MPa at 25° C. and a glass transition temperature ranging from about 20 to about 31° C.

TABLE 7

| (Composition 7) | | | |
|---|---|---|---|
| Material | Concentration (percent by weight) | Trade name | Supplier |
| Flexible epoxy resin | 55.0-88.0 | EXA-4850 | Dainippon Ink |
| Bisphenol-F | 0-27.0 | 830-LVP | Dainippon Ink |
| Imidazole catalyst | 7.4-11.0 | CUREZOL-17-Z | Air Products |
| Epoxy Silane | 0.6-1.0 | A-187 | GE Silicones |
| Amine adduct | 0-3.5 | ANCAMINE 2337 | Air Products |
| Fumed Silica | 0-3.5 | TS-720 | Cabot |

As provided in Table 7, Composition 7 includes from about 50.0 to about 95.0 percent by weight flexible epoxy resin, from about 0 to about 50 percent by weight bisphenol-F, from about 0.1 to about 20.0 percent by weight of imidazole catalyst thermal curative agent, from about 0.1 to about 20 percent by weight epoxy silane coupling agent, from about 0 to about 20 percent by weight of amine adduct, and from about 0 to about 30 percent by weight fumed silica. As shown in Table 8, Composition 7 has a low shear modulus value ranging from about 3.9 to about 8.7 MPa at 25° C. and a glass transition temperature ranging from about 27 to about 60° C.

A comparison of the shear modulus and glass transition temperature properties of the Compositions 1-7 compared to a conventional die bond adhesive available from Emerson & Cuming of Monroe Township, N.J. under the trade name ECCOBOND 3193-17 are provided in Table 8.

TABLE 8

| Sample | Shear Modulus (MPa) (25° C.) | Tg (° C.) |
|---|---|---|
| Eccobond 3193-17 | 15.4 | 92.3 |
| Composition 1 | 0.225 | 10.5 |
| Composition 2 | 1.98 | −11.2 |
| Composition 3 | 0.175 | −6.7 |

TABLE 8-continued

| Sample | Shear Modulus (MPa) (25° C.) | Tg (° C.) |
|---|---|---|
| Composition 4 | 0.151 | −30 |
| Composition 5 | 0.74 | <−60 |
| Composition 6 | 1.75-4.4 | 20-31 |
| Composition 7 | 3.9-8.72 | 27.7-60 |

As illustrated in Table 8, the ECCOBOND 3193-17 adhesive has a relatively high shear modulus value of 15.4 MPa at 25° C. as compared to the shear modulus values of the Compositions 1-7 which are all less than 10 MPa at 25° C. Similarly, the ECCOBOND 3193-17 has a relatively high glass transition temperature of 92.3° C. compared to the much lower values of the compositions 1-7 which are all less than 65° C. In other words, ECCOBOND 3193-17 becomes significantly more rigid when it cools to about 92° C., whereas Compositions 1-7 do not become significantly more rigid until cooling to at least about 65° C.

Various embodiments of the invention are also directed to a micro-fluid ejection device including a substrate/nozzle plate assembly and a thermally curable adhesive attached thereto, the adhesive having a shear modulus of less than about 10.0 MPa at 25° C. In one particular embodiment, shown in FIG. 4B, a substrate/nozzle plate assembly 20/34 is attached to head portion 14 by a die attach adhesive 50 made according to Composition 1 above. In a related embodiment, a substrate chip/nozzle plate assembly 20/34 is attached to a head portion by a die attach adhesive made according to Composition 2 above. In yet other embodiments, micro-fluid ejection heads are attached to head portions by die attach adhesives made according to Compositions 3, 4 and 5 above having a relatively low shear modulus values at 25° C. and having glass transition temperatures of less than about 65° C.

It is contemplated, and will be apparent to those skilled in the art from the preceding description and the accompanying drawings that modifications and/or changes may be made to the embodiments of the disclosure. Accordingly, it is expressly intended that the foregoing description and the accompanying drawings are illustrative of exemplary embodiments only, not limiting thereto, and that the true spirit and scope of the present disclosure be determined by reference to the appended claims.

What is claimed is:

1. A thermally curable adhesive composition for attaching a micro-fluid ejection head to a device, the adhesive composition comprising:

from 55.0 to 88.0 percent by weight, based on the overall adhesive composition, of a flexible epoxy resin;

from greater than 0 to 3.5 percent by weight, based on the overall adhesive composition, of an amine adduct;

from 7.4 to 11.0 percent by weight, based on the overall adhesive composition, of an imidazole catalyst thermal curative agent; and from 0.6 to 1.0 percent by weight, based on the overall adhesive composition, of an epoxy silane coupling agent, wherein the adhesive composition has shear modulus of less than about 10 MPa at 25° C. and glass transition temperature of less than about 65° C.

2. The adhesive composition of claim 1, further comprising from greater than 0 to 3.5 percent by weight, based on the overall adhesive composition, of a fumed silica.

* * * * *